United States Patent [19]

Ishikawa et al.

[11] Patent Number: 5,692,915

[45] Date of Patent: Dec. 2, 1997

[54] ELECTRICAL CONNECTING DEVICE BETWEEN STATIONARY AND ROTATABLE BODIES

[75] Inventors: Satoshi Ishikawa; Norihito Suzuki, both of Shizuoka-ken, Japan

[73] Assignee: Yazaki Corporation, Tokyo, Japan

[21] Appl. No.: 567,585

[22] Filed: Dec. 5, 1995

[30] Foreign Application Priority Data

Dec. 9, 1994 [JP] Japan .................. 6-306279

[51] Int. Cl.$^6$ ........................ H01R 3/00
[52] U.S. Cl. ........................ 439/169; 439/15
[58] Field of Search ................ 439/15, 164, 27, 439/10; 174/115, 68.1

[56] References Cited

U.S. PATENT DOCUMENTS 4,638,117  1/1987  Ney ............................ 174/115
4,744,763  5/1988  Suzuki et al. ............... 439/15

FOREIGN PATENT DOCUMENTS 2-20791   6/1990  Japan .
2-139876  11/1990 Japan .

Primary Examiner—Gary F. Paumen
Assistant Examiner—Christopher Goins
Attorney, Agent, or Firm—Finnegan, Henderson, Farabow, Garrett & Dunner, L.L.P.

[57] ABSTRACT

The electrical connecting device has a cable compartment including spaced inner and outer annular portions. At least one of the top and bottom walls of each annular portion is formed with an annular groove. The portion of compartment other than the portions having annular grooves has a height H1 between the top and bottom walls. The height H1 is substantially equal to the width W of a flexible flat cable. The cable may be formed with projections on its edges. The compartment height H1 may be set between the width of the cable portion with the projections and the width of the cable portion without the projections. Therefore, the connector with high quality and high reliability can prevent an impinging noise from being made by vibration.

8 Claims, 5 Drawing Sheets

ELECTRICAL CONNECTING DEVICE BETWEEN STATIONARY AND ROTATABLE BODIES

BACKGROUND OF THE INVENTION

1. Field of the Invention

The present invention relates to apparatus for electrically interconnecting a stationary body and a rotatable body by means of a flexible flat cable. The apparatus may, for example, be used in the steering system of an automobile.

2. Description of the Prior Art

For example, Japanese Utility Model Registration Publication No. 2-20791 shows an electrical connecting device between a stationary and a rotatable bodies. The connector electrically interconnects an electric component mounted on a car and the component control element fitted on the steering wheel. The connector has an annular compartment housing a flexible flat cable winding. The compartment top and bottom walls have radial ridges like ribs, so that the contact area between the cable and the walls becomes smaller. Consequently, when turns of the cable radially move in the compartment as the rotatable body rotates, a sliding noise can be prevented from being made.

However, if this cable suffers vibration from the outside while the car runs, it may impinge on the top and bottom walls, and adjacent turns of the cable may impinge on each other. This makes impinging noises.

Japanese Utility Model Registration Laid-Open No. 2-139876 shows a cable reel, which has an annular compartment housing a flexible flat cable. The compartment top and bottom walls have radially extending wavy ridges. The wavy convexities of the ridges on one of the walls are aligned with the concavities of the ridges on the other. Consequently, the radial movement of the cable turns is regulated, so that adjacent turns of the cable do not impinge on each other.

However, if this cable is vertically vibrated by vibration from the outside, it may impinge on the top and bottom walls with resultant noises.

SUMMARY OF THE INVENTION

The object of this invention is to provide an electrical connecting device between a stationary and a rotatable bodies, which is able to prevent an impinging noise from being made by vibration from the outside.

An electrical connecting device according to one form of the invention includes a stationary and a rotatable, generally circular bodies. The bodies are assembled coaxially with and rotatably relative to each other to form an annular compartment between the bodies. The compartment has both end walls extending generally radially. The compartment includes an inner, an intermediate and an outer annular portions. A winding of flexible flat cable is housed in the compartment. One end of the cable is fixed to and extends out of the stationary body. The other end of the cable is fixed to and extends out of the rotatable body. The intermediate portion of the cable is adapted to be wound and rewound into the inner and outer compartment portions, respectively, without being entangled as the rotatable body rotates. The inner and outer annular compartment portions each have an annular groove formed on at least one of the end walls. The groove is concentric with the rotatable body. The portion other than the portions having the annular grooves has an axial height substantially equal to the width of the intermediate cable portion.

Thus, the annular grooves exist on at least one of the end walls of each of the inner and outer compartment portions, and the axial height of the portion without the grooves substantially equals the cable width. Consequently, there is substantially no clearance between the cable and the end walls in the intermediate portion. Even if vibration is transmitted from the outside, an intermediate portion of the cable is virtually fixed at the intermediate compartment portion, so that an impinging noise is prevented from being made by the vibration from the outside.

An electrical connecting device according to another form of the invention includes a stationary and a rotatable, generally circular bodies. The bodies are assembled coaxially with and rotatably relative to each other to form an annular compartment between the bodies. The compartment has both end walls extending generally radially. The compartment includes an inner, an intermediate and an outer annular portions. A winding of flexible flat cable is housed in the compartment. One end of the cable is fixed to and extends out of the stationary body. The other end of the cable is fixed to and extends out of the rotatable body. The intermediate portion of the cable is adapted to be wound and rewound into the inner and outer compartment portions, respectively, without being entangled as the rotatable body rotates. The inner and outer annular compartment portions each have an annular groove formed on at least one of the end walls. The groove is concentric with the rotatable body. The intermediate cable portion has projections formed on at least one edge. The projections project toward at least one of the end walls of the compartment. The projections are spaced from each other longitudinally of the cable. The portion other than the portions having the annular grooves has an axial height between the widths of the cable portion with the projections and the cable portion without the projections.

Thus, the axial height of portion without grooves is set between the widths of the cable portion with the projections and the cable portion without the projections. Consequently, there is no clearance between the cable and the end walls in this compartment portion, so that an impinging noise is prevented from being made by vibration from the outside.

In each of these connecting devices, the intermediate annular compartment portion may also have an annular groove formed on at least one of the end walls. This groove is concentric with the rotatable body. Consequently, an impinging noise can be more effectively prevented from being made.

In each of these connecting devices, the compartment may be formed by a bottomed cylindrical under cover and a disclike upper cover over the under cover. The annular grooves exist in the lower surface of the upper cover. It is easier to form annular grooves.

The nature, principle and utility of the invention will become more apparent from the following detailed description when read in conjunction with the accompanying drawings.

BRIEF DESCRIPTION OF THE DRAWINGS

Preferred embodiments of the present invention are described below with reference to the accompanying drawings, wherein.

DESCRIPTION OF THE PREFERRED EMBODIMENTS

Figure 1:
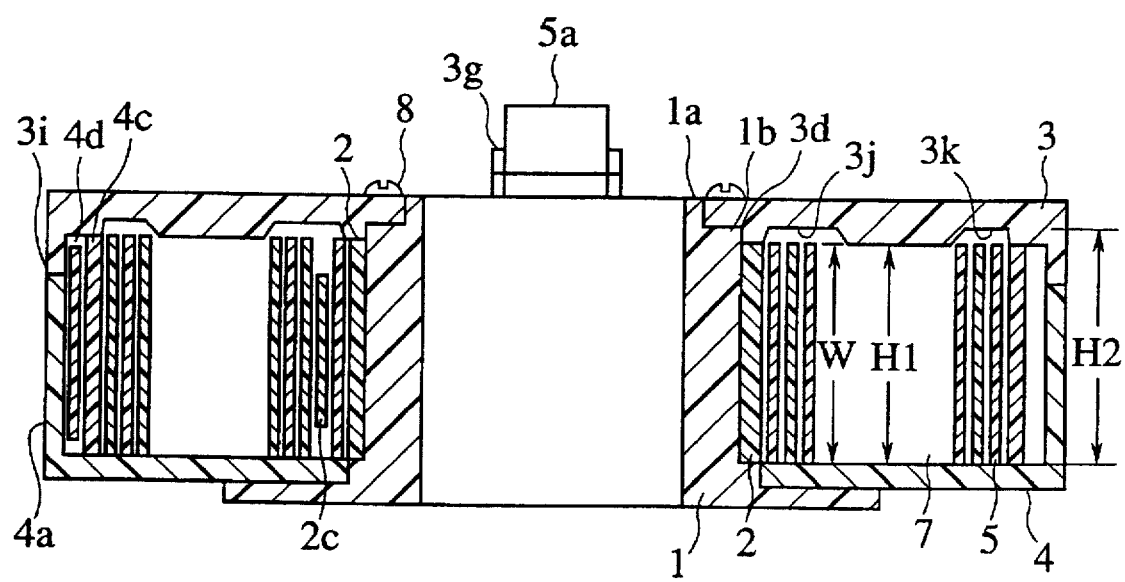
FIG. 1 is a cross-sectional view showing an electrical connecting device according to a first embodiment of the present invention.
Figure 2:
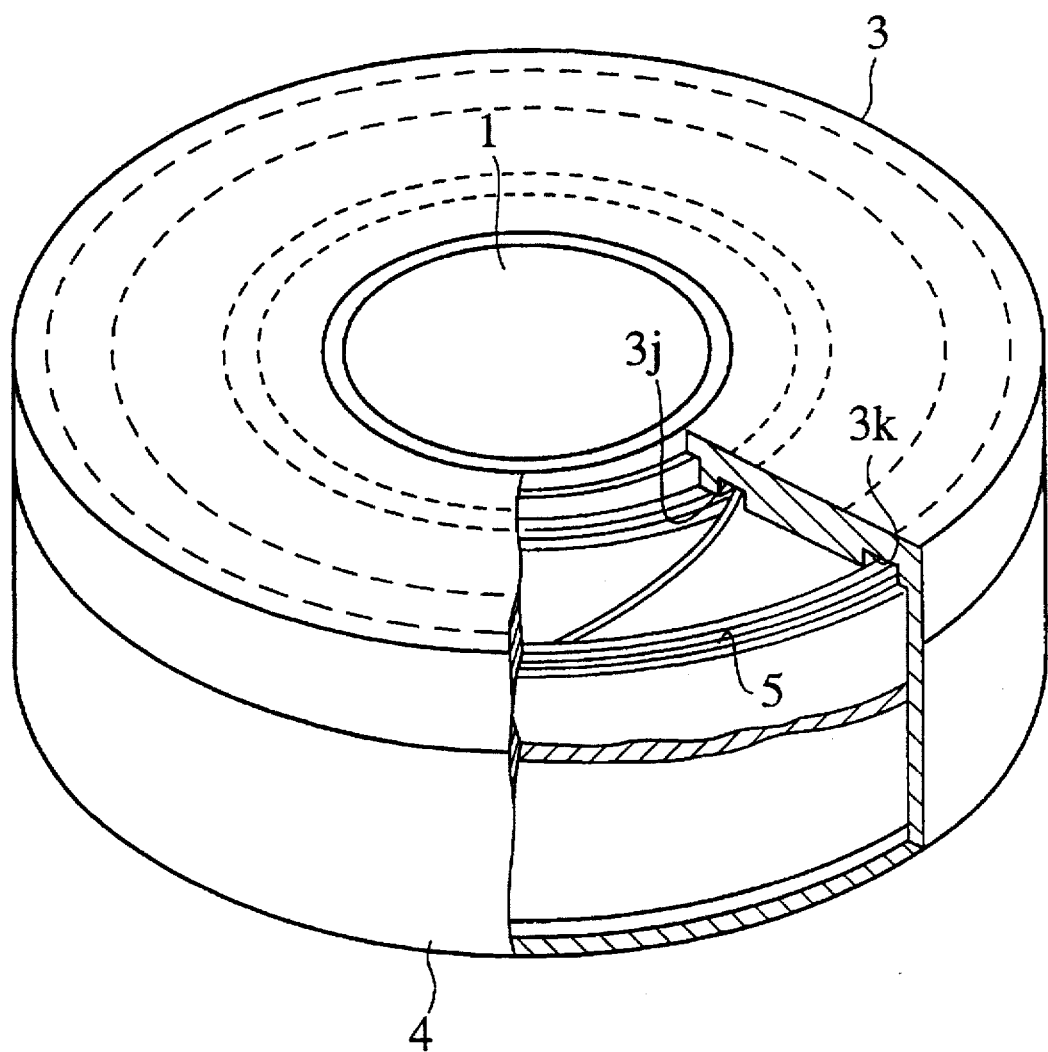
FIG. 2 is a schematic perspective view showing this embodiment.
Figure 3:
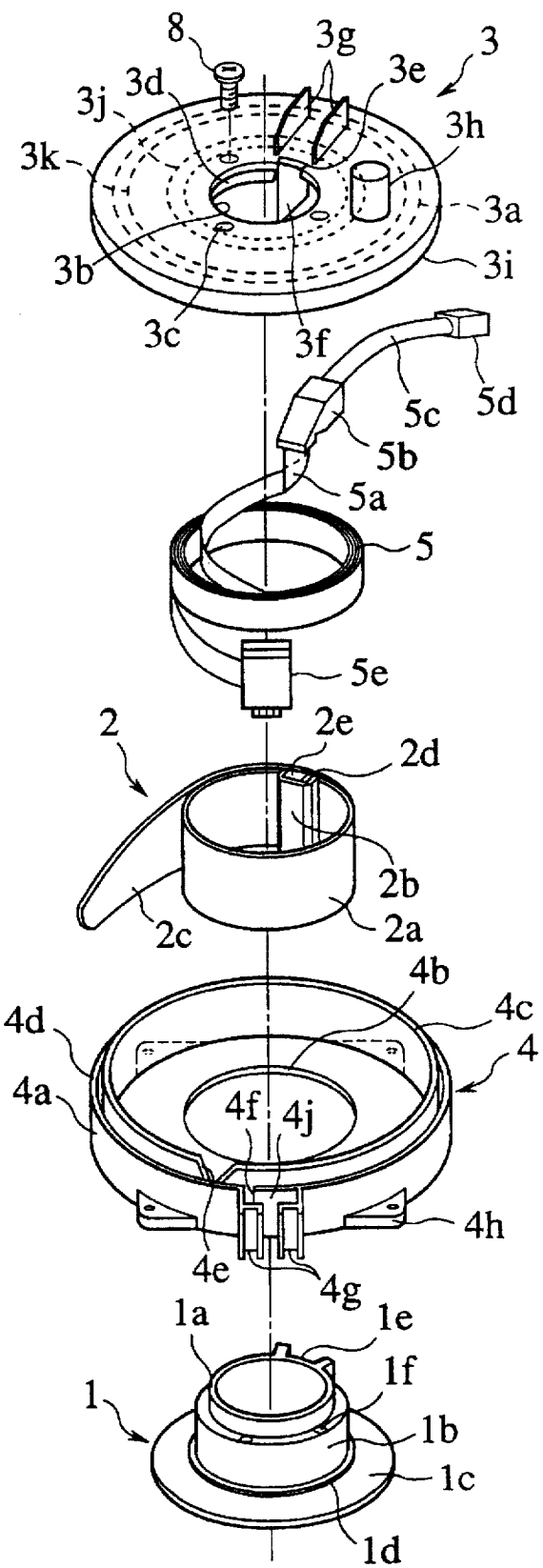
FIG. 3 is an exploded perspective view showing this embodiment.

In FIGS. 1–3, a rotator 1 includes a main annular portion 1b, through which a steering wheel shaft (not shown) may extend rotatably. A boss 1a extends axially from the top of the main portion 1b. The inner cylindrical walls of boss 1a and main portion 1b are flush with each other. The boss 1a has an outer diameter smaller than the main portion 1b. A flange 1c extends radially from the bottom of main portion 1b. The main portion 1b is formed with an annular step 1d in the corner between the portion 1b and flange 1c. The periphery of boss 1a has a pair of projections extending axially and forming a recess 1e between them. The recess 1e is aligned with the recess (not shown) in the periphery of main portion 1b. The top surface of main portion 1b is formed with tapped or threaded holes 1f.

An end support 2 includes a vortical band plate 2a, which is substantially equal in width to the main portion 1b of rotator 1. The inner end of band plate 2a is formed with a mooring part 2b projecting inward. The outer end of mooring part 2b is fixed to the inside of band plate 2a, so that the plate 2a and part 2b form an inner space 2d. The outer end of band plate 2a is formed with a stopper lip 2c. Formed between the root portion of lip 2c and the junction of band plate 2a and mooring part 2b is a slit 2e, which communicates with the space 2d.

The band plate 2a is placed around the main portion 1b of rotator 1 from above with the mooring part 2b inserted into the recess 1e. The band plate 2a rests on the step 1d. The end support 2 is thus mounted on the rotator 1 rotatably with it.

An upper cover 3 includes a disc 3a, which may be fixed to the steering wheel (not shown). The disc 3a has a center hole 3b formed through it. The inner periphery of disc 3a has an annular step 3d formed in its lower surface. The step 3d has screw holes 3c formed through it. The step 3d and disc 3a have a cutout 3e opening into the center hole 3b. From the lower surface of disc 3a extends a lock clip 3f along the outer periphery of cutout 3e. From the upper surface of disc 3a extend a pair of holders 3g radially outward from the cutout 3e. From this upper surface also extends a projection 3h, which is spaced circumferentially from the holders. The outer periphery of disc 3a has a rim 3i extending downward. The lower surface of disc 3a has two annular grooves 3j and 3k.

An under cover 4 is mounted on the rotator flange 1c and around the end support 2. A winding of flexible flat cable 5 is put between the support 2 and the under cover 4. Thereafter, the upper cover 3 is mounted on the rotator 1 by inserting the lock clip 3f into the inner space 2d, engaging the center hole 3b with the boss 1a, placing the step 3d on the top of main portion 1b, and tightening screws 8 through the holes 3c into the holes 1f. Thus, the upper cover 3 is mounted rotatably with the rotator 1 through the support 2, so that the components 1, 2, and 3 form a rotary unit.

The under cover 4 includes an outer cylindrical case 4a, which is substantially equal in diameter to the upper cover 3. The case 4a has a bottom formed with a circular center opening 4b. An inner cylinder 4c is mounted inside the case 4a coaxially and rotatably with it. Formed between the peripheral wall of case 4a and the cylinder 4c is an annular gap 4d. The cylinder 4c has a slit 4e. The peripheral wall of case 4a has a slit 4f spaced from the slit 4e in one circumferential direction. The peripheral wall also has a pair of holders 4g projecting outward on both sides of slit 4f. The case 4a has four feet 4h projecting outward from the bottom. The rotator boss 1a is inserted into the opening 4b from below. The rotator step 1d engages slidably with the opening 4b. The bottom of case 4a rests on the rotator flange 1c.

The feet 4h may be fixed to the steering column (not shown), in order that the under cover 4 forms a fixed unit.

Each holder 4g has a side wall extending outward from the peripheral wall of case 4a radially of it. The left side wall is located on the left edge of slit 4f. The right side wall is spaced from the slit 4f. From the outer end of each side wall extends an outer wall toward each other. The outer walls are spaced from each other. The side and outer walls, and the peripheral wall of case 4a between the right side wall and slit 4f form a space 4j, which opens through the slit 4f into the gap 4d.

By putting the upper cover 3 over the under cover 4, an annular cable compartment 7 (FIG. 1) is formed around the rotator portion 1b inside the under cover 4. The lower surface of upper cover disc 3a forms the top wall of compartment 7. The annular grooves 3j and 3k are arranged over the inner and outer annular portions, respectively, in the compartment 7 concentrically with the rotator boss 1a. The upper surface of the bottom of under cover 4 forms the bottom wall of compartment 7. The intermediate annular portion of compartment 7 between the inner and outer portions has a height H1 between the top and bottom walls. The height H1 is set to be substantially equal to the width W of the intermediate portion of the winding of flexible flat cable 5, which is described later (H1=W). The height H2 between the top and bottom walls of compartment 7 at the annular grooves 3j and 3k is set to be greater than the cable width W (H2>W). In the intermediate annular portion of compartment 7, there is substantially no clearance between the cable 5 and the top wall. In the inner and outer annular portions of compartment 7, the grooves 3j and 3k form clearances.

The vortical flat cable 5 has a bend 5a, which turns the direction of the cable extension upward at a substantially right angle by obliquely bending the inner end of the vortical cable. The upper end of bend 5a is connected through a support block 5b to a cable 5c for external connection, which is connected at its other end to a connector 5d. The outer end of flat cable 5 is connected to a wire harness connection 5e.

The under cover 4 is mounted rotatably on the rotator 1. The end support 2 is mounted on the rotator 1 rotatably with it. Thereafter, the intermediate portion of flat cable 5 is put between the support 2 and the under cover cylinder 4c. The outer end portion of cable 5 is inserted into the cylinder slit 4e and case slit 4f across the annular gap 4d, in order that the outer end of cable 5 is moored to the under cover 4. The wire harness connection 5e is fitted into the holder space 4j. The cable bend 5a is inserted into the end support space 2d by passing it between the free end of stopper lip 2c and band plate 2a, and through the slit 2e.

Thereafter, the cable connector 5d, the cable 5c for external connection and the support block 5b are passed through the upper cover center hole 3b from below. The upper cover lock clip 3f is inserted into the end support space 2d between the mooring part 2b and cable bend 5a. The center hole 3b is engaged around the rotator boss 1a. The upper cover 3 is fixed to the rotator 1 with the screws 8. The upper portion of cable bend 5a is passed through the upper cover cutout 3e. The cable support block 5b is fitted between the upper cover holders 3g. As shown in FIG. 1, the upper cover rim 3i is axially aligned with the cylindrical wall of under cover case 4a. The intermediate portion of flat cable 5 is housed in the compartment 7 formed between the covers 3 and 4. The outer end portion of flat cable 5 is moored to the under cover 4 as the fixed unit, and extends outward. The inner end of cable 5 is moored to the end support 2 and upper cover 3 as the rotary unit, and extends outward.

The length of flat cable 5 is such that there is sufficient space in the compartment 7 and the turns of the cable can radially move.

If the rotator 1 rotates with the end support 2 and upper cover 3 in the direction to rewind the flat cable 5, the support 2 exerts force on the cable bend 5a to expand the winding of cable 5. In other words, the rotation of rotator 1 expands the cable winding in the inner annular portion of compartment 7, which includes the circumferential groove 3j. This exerts force in the expanding direction on the portion of cable 5 which extends between the inner and outer circumferential grooves 3j and 3k. As the winding is expanded in the intermediate annular portion of compartment 7, which has no clearance, the cable 5 is wound into the outer annular portion at groove 3k. As the rotator 1 rotates, the cable 5 is gradually rewound with its vortex diameter increasing and the number of turns decreasing. When the number of revolutions of rotator 1 in this direction approaches the preset maximum allowable value, the number of turns of cable 5 becomes minimum, and the cable 5 reaches the outer annular portion of compartment 7 at the groove 3k, close to the under cover cylinder 4c.

Then, if the rotator 1 rotates with the end support 2 and upper cover 3 in the other direction to wind up the flat cable 5, the support 2 draws the cable bend 5a to contract the winding of cable 5. In other words, the rotation of rotator 1 draws the cable 5 inward. Under tension in the intermediate annular portion of compartment 7, which has no clearance, the cable 5 is wound from the groove 3k to the groove 3j. As the rotator 1 rotates, the cable 5 is gradually wound with its vortex diameter decreasing and the number of turns increasing. When the number of revolutions of rotator 1 in this direction approaches the preset maximum allowable value, the number of cable turns becomes maximum, and the cable 5 reaches the inner annular portion of compartment 7 at the groove 3j, close to the end support 2.

As already stated, the height H1 of the intermediate annular portion of compartment 7 between the grooves 3j and 3k substantially equals the width W of flat cable 5 (H1=W), so that there is no clearance between the cable and the top and bottom walls. Consequently, while the turns of cable 5 move between the inner and outer annular portions of compartment 7 when the cable 5 is wound or rewound, the cable 5 is virtually fixed even in the intermediate portion of compartment 7.

As a result, if the apparatus is mounted on the steering system of a car, for example, and when the car is running, the intermediate portion of flat cable 5, which is virtually fixed in the intermediate annular portion of compartment 7, does not move in any directions, even though the cable 5 vibrates as the rotator 1, covers 3 and 4, etc. are vibrated by the boss 1a. Accordingly, the intermediate portion of cable 5 does not impinge on the covers 3 and 4, and the adjacent turns of cable 5 does not impinge on each other, so that an impinging or sound is completely prevented from being made.

The adjacent turns of flat cable 5 having moved from the intermediate annular portion of compartment 7 to the inner or outer portion at the groove 3j or 3k are fixed close to each other on the end support 2 or the cylindrical wall of under cover 4 by the winding or rewinding force. Accordingly, although the vertical clearances exist between the cable 5 and the grooves 3j and 3k, there is substantially no impinging noise made by external vibration as is the case with a running car.

Because of the clearances between the cable 5 and the grooves 3j and 3k, the cable winding can gradually and smoothly expand or contract between the inner and outer annular portions of compartment 7 while the cable 5 is rewound or wound.

The compartment 7 is formed by the bottomed cylindrical under cover 4 and the disclike upper cover 3, which is formed with the circumferential grooves 3j and 3k in its lower surface. It is easier to form circumferential grooves in the upper cover 3 than in the bottom of under cover 4.

Figure 4:
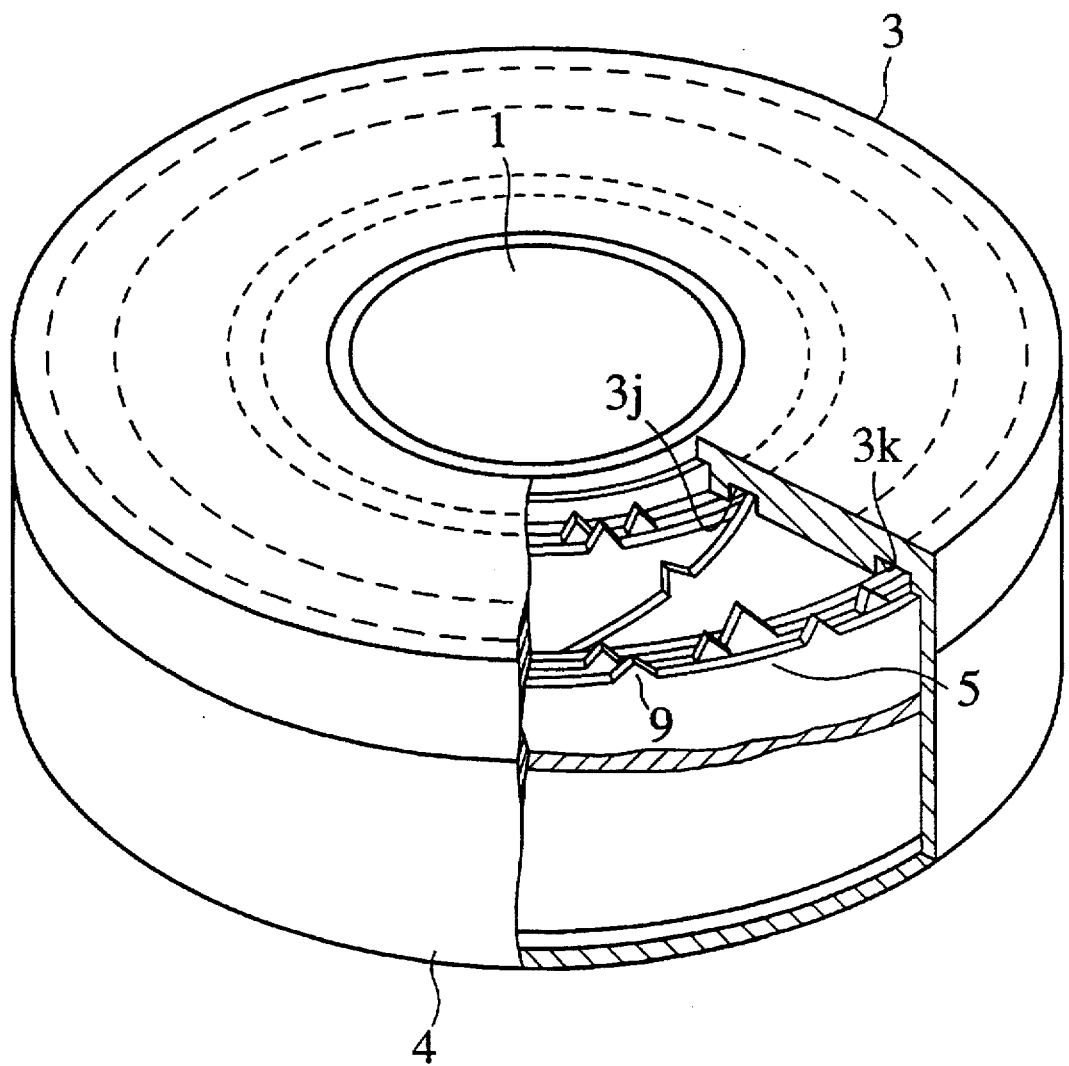
FIG. 4 is a perspective view showing a second embodiment.
Figure 5:
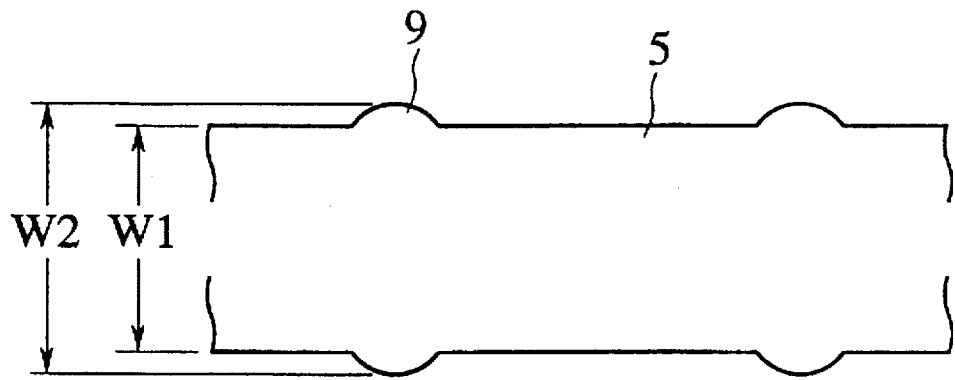
FIG. 5 is an expanded view showing a main portion of a flexible flat cable of the second embodiment.

FIG. 4 and 5 show another embodiment, where the intermediate portion of flexible flat cable 5 has projections 9 at longitudinal intervals on both edges. The projections 9 on one edge are aligned with those on the other.

As shown in FIG. 5, the projections 9 project toward the top and bottom walls of compartment 7. The cable 5 has a width W1 at the portions without the projections 9 and a width W2 at the portions with the projections 9. The relation among the widths W1 and W2 and the heights H1 and H2 (FIG. 1) of compartment 7 is W1<H1<W2<H2.

In other words, the height H1 of the intermediate annular portion of compartment 7 is set between the cable widths W1 and W2. Consequently, the projections 9 remove the clearances between the cable 5 and the top and bottom walls in the intermediate portion of compartment 7, so that there is no impinging noise made by external vibration.

The projections 9 exist on both edges of cable 5. Accordingly, by suitably setting the relation of H1<W2, the frictional resistance when the cable 5 moves in the intermediate annular portion of compartment 7 cannot extremely increase, and the cable 5 can smoothly move.

Figure 6:
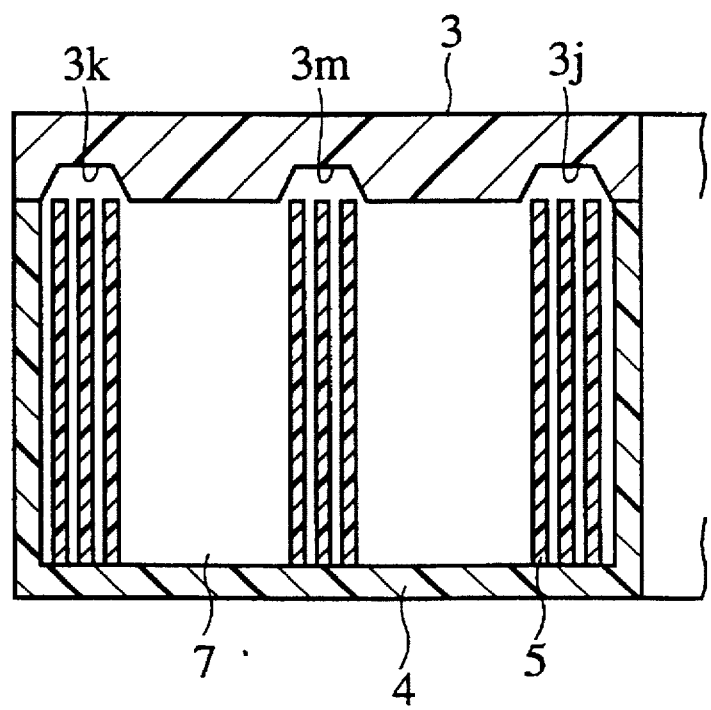
FIG. 6 is a cross-sectional view showing a third embodiment.

FIG. 6 shows a further embodiment, where the upper cover 3 has another circumferential groove 3m between the grooves 3j and 3k in its lower surface. The groove 3m takes in the cable 5 moving between the inner and outer annular portions of compartment 7. Consequently, the radial movement of cable 5 can be smoother, and an impinging noise can be more suitably prevented from being made.

In each of the embodiments, the circumferential grooves exist in the top wall of compartment 7. Otherwise, such grooves may exist in the bottom wall, or both the top and bottom walls of compartment 7 with similar effect.

In each embodiment, the vortical or winding direction of flat cable 5 does not reverse midway. Otherwise, this invention may be applied to a flexible flat cable of the type where the vortical direction reverses midway (not illustrated).

In accordance with the invention, there is substantially no clearance between the flexible flat cable and the top and bottom walls in the intermediate annular portion of the cable compartment. Even if vibration is transmitted from the outside, an intermediate portion of the cable is virtually fixed at the intermediate portion of the compartment, so as to completely prevent an impinging noise from being made.

In accordance with the invention, the intermediate portion of the compartment has a height between the width of the cable portion with the projections and the width of the cable portion without projections. There is no clearance between the cable and the top and bottom walls in the intermediate portion of the compartment. This can more effectively prevent an impinging noise from being made by external vibration.

In accordance with the invention, at least one of the top and bottom walls of the intermediate portion of the compartment is formed with annular grooves. The radial movement of the cable can be smooth, and it is possible to prevent an impinging noise from being made.

In accordance with the invention, annular grooves are formed in the lower surface of the disclike upper cover forming the compartment. It is easier to form annular grooves there than in the bottom of a bottomed cylinder.

It should be understood that many modifications and adaptations of the invention will become apparent to those skilled in the art and it is intended to encompass such obvious modifications and changes in the scope of the claims appended hereto.

What is claimed is:

1. An electrical connecting device comprising: a stationary generally circular body and a rotatable generally circular body, the bodies being assembled coaxially with each other and rotatably relative to each other to form an annular compartment between said bodies, said compartment having first and second end walls which extend generally radially, and a winding of flexible flat cable housed in said compartment, one end of said cable being fixed to and extending out of said stationary body, the other end of said cable being fixed to and extending out of said rotatable body, an intermediate portion of said cable being adapted to be wound and rewound into said inner and outer compartment portions, respectively, without being entangled as said rotatable body rotates;

wherein a first annular groove is defined on at least one of the end walls, defining an inner annular portion of said compartment, and a second annular groove is defined on at least one of the end walls, spaced from the first annular groove and defining an outer annular portion of said compartment, said first and second grooves being concentric with said rotatable body, said inner and outer annular portions of said compartment defined by said first and second grooves having an axial height greater than a width of said intermediate portion of said cable, and an intermediate portion of said compartment between the inner and outer annular portions having an axial height substantially equal to the width of said intermediate portion of said cable.

2. The connector according to claim 1, wherein said intermediate annular compartment portion has an intermediate annular groove formed on at least one of the end walls, said intermediate annular groove being concentric with said rotatable body.

3. The connector according to claim 1, wherein said compartment is formed by a bottomed cylindrical under cover and a disclike upper cover over said bottomed cylindrical under cover, said annular grooves existing in the lower surface of said disclike upper cover.

4. The connector according to claim 2, wherein said compartment is formed by a bottomed cylindrical under cover and a disclike upper cover over said bottomed cylindrical under cover, said annular grooves existing in the lower surface of said disclike upper cover.

5. An electrical connecting device comprising a stationary generally circular body and a rotatable generally circular body, the bodies being assembled coaxially with each other and rotatably relative to each other to form an annular compartment between said bodies, said compartment having first and second end walls which extend generally radially, and a winding of flexible flat cable housed in said compartment, one end of said cable being fixed to and extending out of said stationary body, the other end of said cable being fixed to and extending out of said rotatable body, an intermediate portion of said cable being adapted to be wound and rewound into said inner and outer compartment portions, respectively, without being entangled as said rotatable body rotates;

wherein a first annular groove is defined on at least one of the end walls, defining an inner annular portion of said compartment, and a second annular groove is defined on at least one of the end walls, spaced from said first annular groove and defining an outer annular portion of said compartment, said first and second grooves being concentric with said rotatable body, said intermediate cable portion having projections formed on at least one edge, said projections projecting toward at least one of the end walls of said compartment, the projections being spaced from each other longitudinally on said cable, said inner and outer annular portions of said compartment defined by said first and second grooves having an axial height greater than a width of the cable portion with said projections, and an intermediate portion of said compartment between the inner and outer portions having an axial height between the widths of the cable portion with said projections and the cable portion without said projections.

6. The connector according to claim 5, wherein said intermediate annular compartment portion has an intermediate annular groove formed on at least one of the end walls, said intermediate annular groove being concentric with said rotatable body.

7. The connector according to claim 5, wherein said compartment is formed by a bottomed cylindrical under cover and a disclike upper cover over said bottomed cylindrical under cover, said annular grooves existing in the lower surface of said disclike upper cover.

8. The connector according to claim 6, wherein said compartment is formed by a bottomed cylindrical under cover and a disclike upper cover over said bottomed cylindrical under cover, said annular grooves existing in the lower surface of said disclike upper cover.

* * * * *